(12) United States Patent
Kita

(10) Patent No.: US 9,395,887 B2
(45) Date of Patent: Jul. 19, 2016

(54) IMAGE PROCESSING APPARATUS AND METHOD FOR REMOVING NOISE FROM A FRAME GROUP

(71) Applicant: Koji Kita, Wakayama (JP)

(72) Inventor: Koji Kita, Wakayama (JP)

(73) Assignee: Noritsu Precision Co., Ltd., Wakayama (JP)

( * ) Notice: Subject to any disclaimer, the term of this patent is extended or adjusted under 35 U.S.C. 154(b) by 298 days.

(21) Appl. No.: 13/940,396

(22) Filed: Jul. 12, 2013

(65) Prior Publication Data

US 2014/0019864 A1    Jan. 16, 2014

(30) Foreign Application Priority Data

Jul. 12, 2012    (JP) ................................. 2012-156164

(51) Int. Cl.
| | |
|---|---|
| H04N 5/225 | (2006.01) |
| G06F 3/0484 | (2013.01) |
| G06K 9/40 | (2006.01) |
| G06T 5/00 | (2006.01) |
| G06T 5/50 | (2006.01) |

(52) U.S. Cl.
CPC ............... *G06F 3/0484* (2013.01); *G06K 9/40* (2013.01); *G06T 5/002* (2013.01); *G06T 5/50* (2013.01); *G06T 2207/20182* (2013.01)

(58) Field of Classification Search
CPC ..................................................... H04N 5/225
USPC ................................................ 348/607, 621
See application file for complete search history.

(56) References Cited

U.S. PATENT DOCUMENTS

| | | | | |
|---|---|---|---|---|
| 5,247,354 | A  * | 9/1993 | Nakajima | ................. H04N 5/21 |
| | | | | 348/621 |
| 2005/0046699 | A1* | 3/2005 | Oya | ................. G08B 13/19602 |
| | | | | 348/207.1 |
| 2007/0248332 | A1* | 10/2007 | Yata | ......................... H04N 5/21 |
| | | | | 386/353 |
| 2010/0302203 | A1* | 12/2010 | Tsuzaki | .................. G06F 3/044 |
| | | | | 345/174 |
| 2012/0293711 | A1* | 11/2012 | Kamio | ...................... H04N 7/01 |
| | | | | 348/448 |
| 2013/0177256 | A1* | 7/2013 | Kita | ........................ G06T 5/002 |
| | | | | 382/266 |
| 2013/0195355 | A1* | 8/2013 | Kita | ........................ G06T 5/002 |
| | | | | 382/167 |

(Continued)

FOREIGN PATENT DOCUMENTS

| | | |
|---|---|---|
| JP | 2007323480 A | 12/2007 |
| JP | 2010226646 A | 10/2012 |

OTHER PUBLICATIONS

Notification of Reasons for Rejection from the Japanese Patent Office Application No. 2012-156164 Issued: Mar. 29, 2016 7 pages.

*Primary Examiner* — Paulos M Natnael
(74) *Attorney, Agent, or Firm* — St. Onge Steward Johnston & Reens LLC

(57) ABSTRACT

An image processing apparatus for removing noise from a frame group on a timeline is provided. This image processing apparatus includes a judgment unit, a division unit, and a removal unit. The judgment unit judges whether changing points where there is a large change between adjacent frames included in the frame group appear at roughly the same interval along the timeline. The division unit, in a case where it is judged that the changing points appear at roughly the same interval, divides the frame group into a plurality of groupings along the timeline in accordance with the interval. The removal unit removes noise from the frame group in units of the groupings.

12 Claims, 11 Drawing Sheets

(56) References Cited

U.S. PATENT DOCUMENTS

| | | | |
|---|---|---|---|
| 2014/0016033 A1* | 1/2014 | Murata | H04N 7/012 348/448 |
| 2014/0016815 A1* | 1/2014 | Kita | G06T 7/0022 382/100 |
| 2014/0019864 A1* | 1/2014 | Kita | G06F 3/0484 715/725 |

* cited by examiner

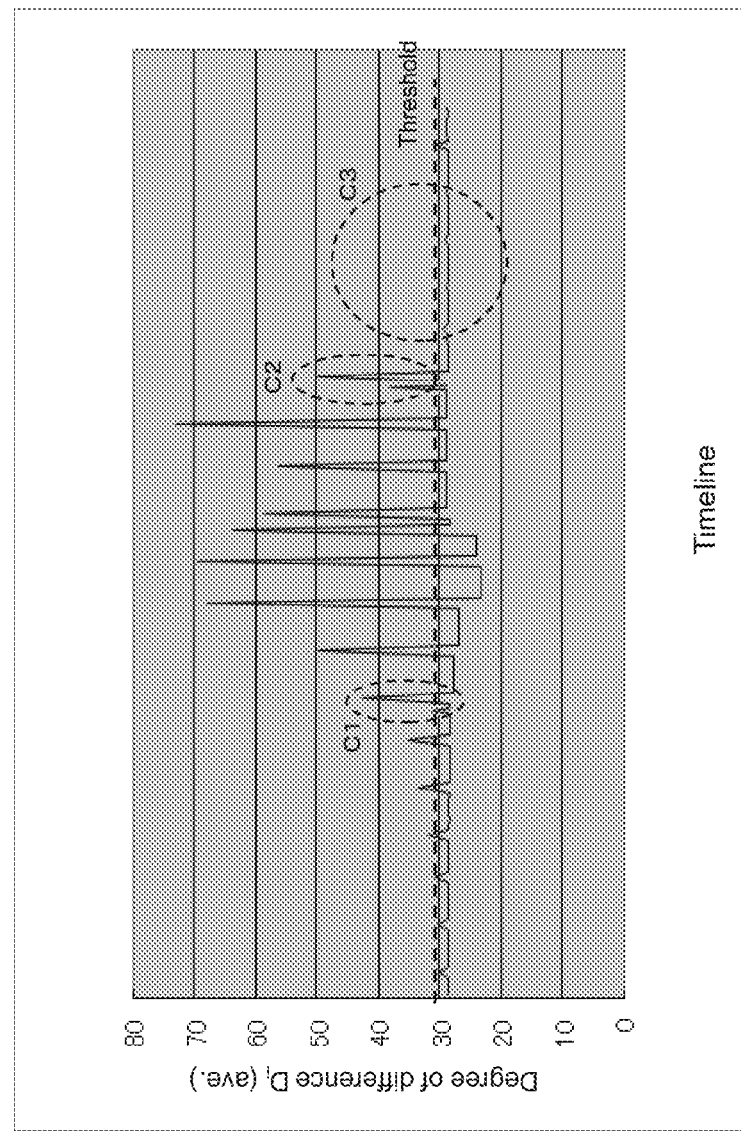

IMAGE PROCESSING APPARATUS AND METHOD FOR REMOVING NOISE FROM A FRAME GROUP

FIELD OF INVENTION

The present invention relates to an image processing apparatus, a recording medium storing an image processing program, and a method of image processing for removing noise from a frame group on a timeline.

BACKGROUND

Technology for removing noise from a frame group on a timeline such as a moving image is conventionally known. For example, Patent Literature 1 (JP 2007-323480A) discloses technology for removing noise from a frame group, by dividing the frame group into units of a plurality of frames along a timeline, and averaging the frames in the units into which the frame group is divided. In Patent Literature 1, in deciding the number of frames to serve as a unit for averaging, a difference value is calculated for each pair of adjacent frames included in the frame group, a histogram of these difference values is created, and the total number of difference values that are greater than or equal to a predetermined threshold is calculated, after which the number of frames to serve as a unit for averaging is decided according to the calculated total number.

Incidentally, a frame group such as a moving image may be recorded in a manner such that the same frames appear successively in roughly the same numbers on a timeline, depending on shooting and recording conditions and the like. For example, this may occur when the frame rate of the recording apparatus is higher than the frame rate of the image capture apparatus. To give a more specific example, if the frame rate of the image capture apparatus is 1 FPS and the frame rate of the recording apparatus is 30 FPS, roughly thirty each of the same frame will be arranged successively on the timeline of the recorded frame group.

However, the plurality of frames of image data that were recorded of the same frame may not be exactly the same due to various types of noise. In this sense, what are referred to as the "same" frame are, strictly speaking, "similar" frames, due to the difference arising from the noise component. Under such circumstances, these similar frames can be utilized to remove noise.

However, the apparatus of Patent Literature 1 does not function adequately under such circumstances. This is because the apparatus of Patent Literature 1 decides the number of frames to serve as a unit for removing noise in the abovementioned manner, and is thus not able to correctly evaluate a succession of similar frames. Note that this problem applies not only to the case where the only difference in similar frames arises clue to the noise component but also to all situations where similar frames appear successively in roughly the same numbers along a timeline.

SUMMARY OF INVENTION

An object of the present invention is to provide an image processing apparatus, a recording medium for an image processing program, and a method of image processing capable of removing noise with high accuracy with respect to a frame group in which similar frames appear successively in roughly the same numbers along a timeline.

An image processing apparatus according to a first aspect of the present invention is an image processing apparatus configured to remove noise from a frame group on a timeline that is provided with a judgment unit, a division unit, and a removal unit. The judgment unit is configured to judge whether changing points where there is a large change between adjacent frames included in the frame group appear at roughly the same interval along the timeline. The division unit is configured to, in a case where it is judged that the changing points appear at roughly the same interval, divide the frame group into a plurality of groupings along the timeline in accordance with the interval. The removal unit is configured to remove noise from the frame group in units of the groupings.

Here, it is judged whether changing points where there is a large change between adjacent frames appear at roughly the same interval along the timeline. In other words, it is judged whether the frames are arranged in a manner such that similar frames appear successively in roughly the same numbers on the timeline. If it is judged that the frame group on the timeline is arranged in such a manner, the grouping to serve a unit for removing noise is determined in accordance with the interval at which the changing points appear, that is, the interval for which similar frames successively appear. That is, the grouping to serve as a unit for removing noise is a grouping of similar frames. Accordingly, noise can be removed with high accuracy, with respect to a frame group in which similar frames appear successively in roughly the same numbers along a timeline.

An image processing apparatus according to a second aspect of the present invention is the image processing apparatus according to the first aspect of the present invention, in which the removal unit is configured to generate, for each grouping, Y number of representative frames representing X number of frames belonging to the grouping. Here, $X \geq 2$ and $Y < X$. That is, here, X similar frames are used to generate Y frames that are fewer in number than the X frames. Accordingly, redundancy due to similar frames appearing a plurality of times is reduced.

An image processing apparatus according to a third aspect of the present invention is the image processing apparatus according to the second aspect of the present invention, in which $Y=1$. That is, here, one frame is generated from a plurality of similar frames. Accordingly, redundancy due to similar frames appearing a plurality of times is further reduced.

An image processing apparatus according to a fourth aspect of the present invention is the image processing apparatus according to one of the first to third aspects of the present invention, in which the removal unit is configured to remove noise by averaging, for each grouping, two or more frames belonging to the grouping. Accordingly, noise can be easily removed.

An image processing apparatus according to a fifth aspect of the present invention is the image processing apparatus according to one of the first to fourth aspects of the present invention, in which the frame group is a frame group captured by an image capture apparatus and recorded by a recording apparatus having a higher frame rate than the image capture apparatus.

That is, here, the frame group that is targeted for noise removal is a frame group in which similar frames that mainly only differ due to the noise component appear successively in roughly the same numbers along the timeline. Accordingly, noise is removed with even higher accuracy.

An image processing apparatus according to a sixth aspect of the present invention is the image processing apparatus according to one of the first to fifth aspects of the present invention, in which the removal unit is configured to perform noise removal, for each group, using frames belonging to the group other than exclusion frames. Exclusion frames are frames that commonly correspond to a plurality of changing points that appear successively along the timeline.

In the case where the frame group on the timeline is divided into a plurality of groupings as described above, there is a relatively high possibility of the first and last frames in each grouping not being similar to the other frames in the same grouping. As a result, a plurality of changing points may successively appear on the timeline, near the boundary between groupings. Here, because it is conceivable that a frame that commonly corresponds to a plurality of changing points that appear successively along the timeline is a first or a last frame that is not similar to the other frames in the same group, this frame is excluded from noise removal processing. As a result, noise can be removed with even higher accuracy.

A recording medium for an image processing program according to a seventh aspect of the present invention is a non-transitory computer-readable recording medium storing an image processing program configured to remove noise from a frame group on a timeline that causes a computer to execute a judgment step, a division step and a removal step. The judgment step is a step of judging whether changing points where there is a large change between adjacent frames included in the frame group appear at roughly the same interval along the timeline. The division step is a step of, in a case where it is judged that the changing points appear at roughly the same interval, dividing the frame group into a plurality of groupings along the timeline in accordance with the interval. The removal step is a step of removing noise from the frame group in units of the groupings. Here, similar effects to the first aspect can be achieved.

An image processing method according to an eighth aspect of the present invention is an image processing method for removing noise from a frame group on a timeline that is provided with a judgment step, a division step, and a removal step. The judgment step is a step of judging whether changing points where there is a large change between adjacent frames included in the frame group appear at roughly the same interval along the timeline. The division step is a step of, in a case where it is judged that the changing points appear at roughly the same interval, dividing the frame group into a plurality of groupings along the timeline in accordance with the interval. The removal step is a step of removing noise from the frame group in units of the groupings. Here, similar effects to the first aspect can be achieved.

BRIEF DESCRIPTION OF DRAWINGS

FIG. 11 is a graph of the degree of difference (average) on a timeline according to a variation.

REFERENCE SIGNS LIST

1 Image processing apparatus (computer)
2 Image processing program
3 Security camera (image capture apparatus)
4 Videotape recorder (recording apparatus)
41b Pattern detection unit (judgment unit)
41c Grouping division unit (division unit)
41d Noise removal unit (removal unit)
G(n) Grouping

DETAILED DESCRIPTION OF THE PREFERRED EMBODIMENTS

Hereinafter, an image processing apparatus, a recording medium storing an image processing program, and a method of image processing according to an embodiment of the present invention will be described, with reference to the drawings.

1. Overview of Image Processing Apparatus

Figure 1:
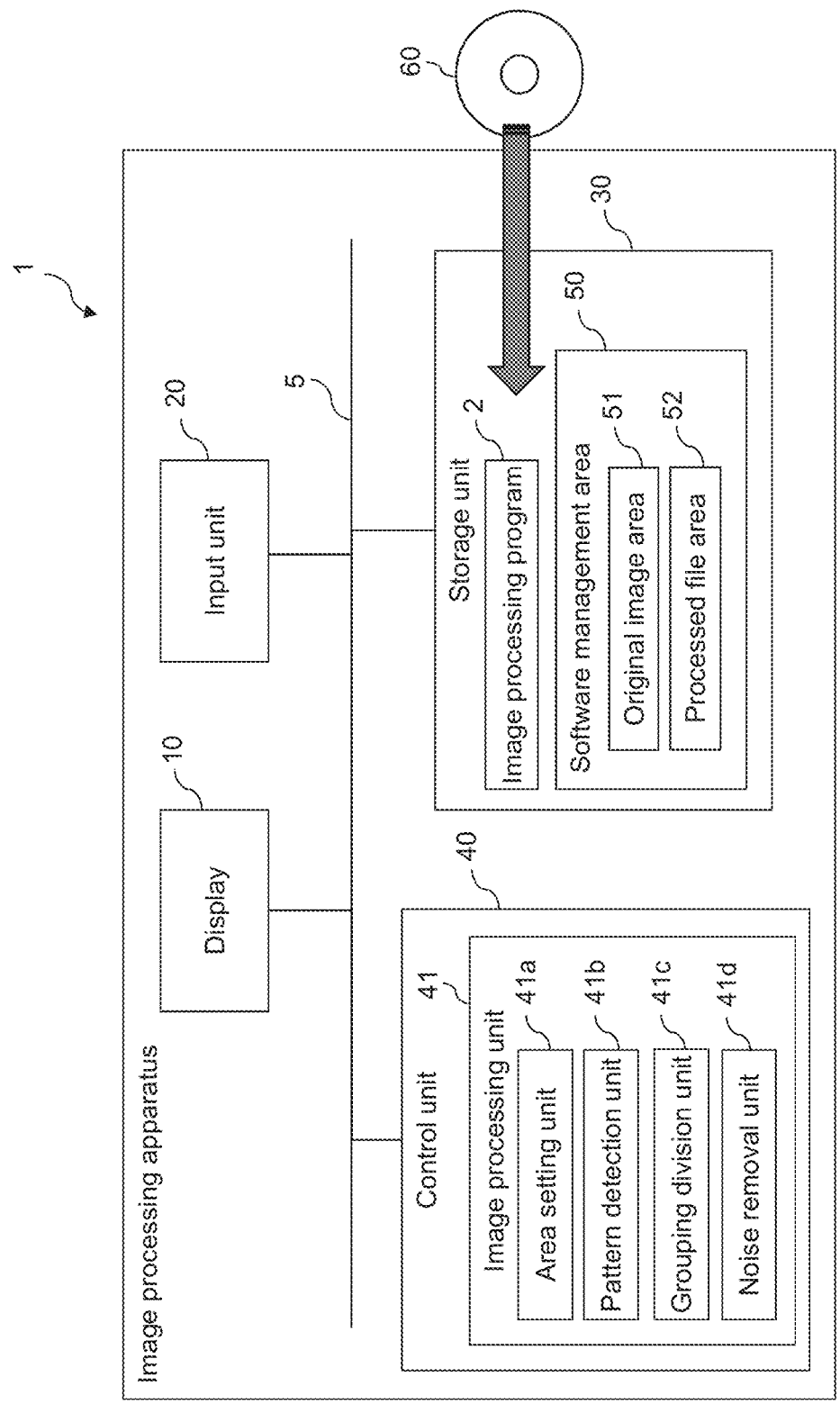
FIG. 1 is a block diagram of an image processing apparatus according to an embodiment of the present invention.

An image processing apparatus 1 shown in FIG. 1 is an embodiment of the image processing apparatus according to the present invention. The image processing apparatus 1 is a general-purpose personal computer. An image processing program 2 is provided to and installed in the image processing apparatus 1 from a computer-readable recording medium 60 such as a CD-ROM or the like storing the program 2. The image processing program 2 is application software for supporting image processing on moving images and still images. The image processing program 2 causes the image processing apparatus 1 to execute steps included in operations discussed later.

The image processing apparatus 1 has a display 10, an input unit 20, a storage unit 30, and a control unit 40. The display 10, the input unit 20, the storage unit 30, and the control unit 40 are connected to one another by a bus line, a cable or the like denoted by reference numeral 5, and can communicate as appropriate. In the present embodiment, the display 10 is a liquid crystal display, and displays later-discussed display screens and the like to a user. The input unit 20 is constituted by a mouse, a keyboard or the like, and receives operations on the image processing apparatus 1 by the user. The storage unit 30 is constituted by a hard disk or the like. The control unit 40 is constituted by a CPU, a ROM, a RAM, and the like.

The image processing program 2 is stored in the storage unit 30. A software management area 50 is secured in the storage unit 30. The software management area 50 is an area that is used by the image processing program 2. An original image area 51 and a processed file area 52 are secured in the software management area 50. The role of each of the areas 51 and 52 will be discussed later.

The control unit 40 operates in a virtual manner as an image processing unit 41, by reading out and executing the image processing program 2 stored in the storage unit 30. In particular, the image processing unit 41, on later-discussed analog noise removal processing being started, operates as an area setting unit 41a, a pattern detection unit 41b, a grouping division unit 41c, and a noise removal unit 41d. Operations of each of the units 41 and 41a to 41d will be discussed later.

Figure 2:
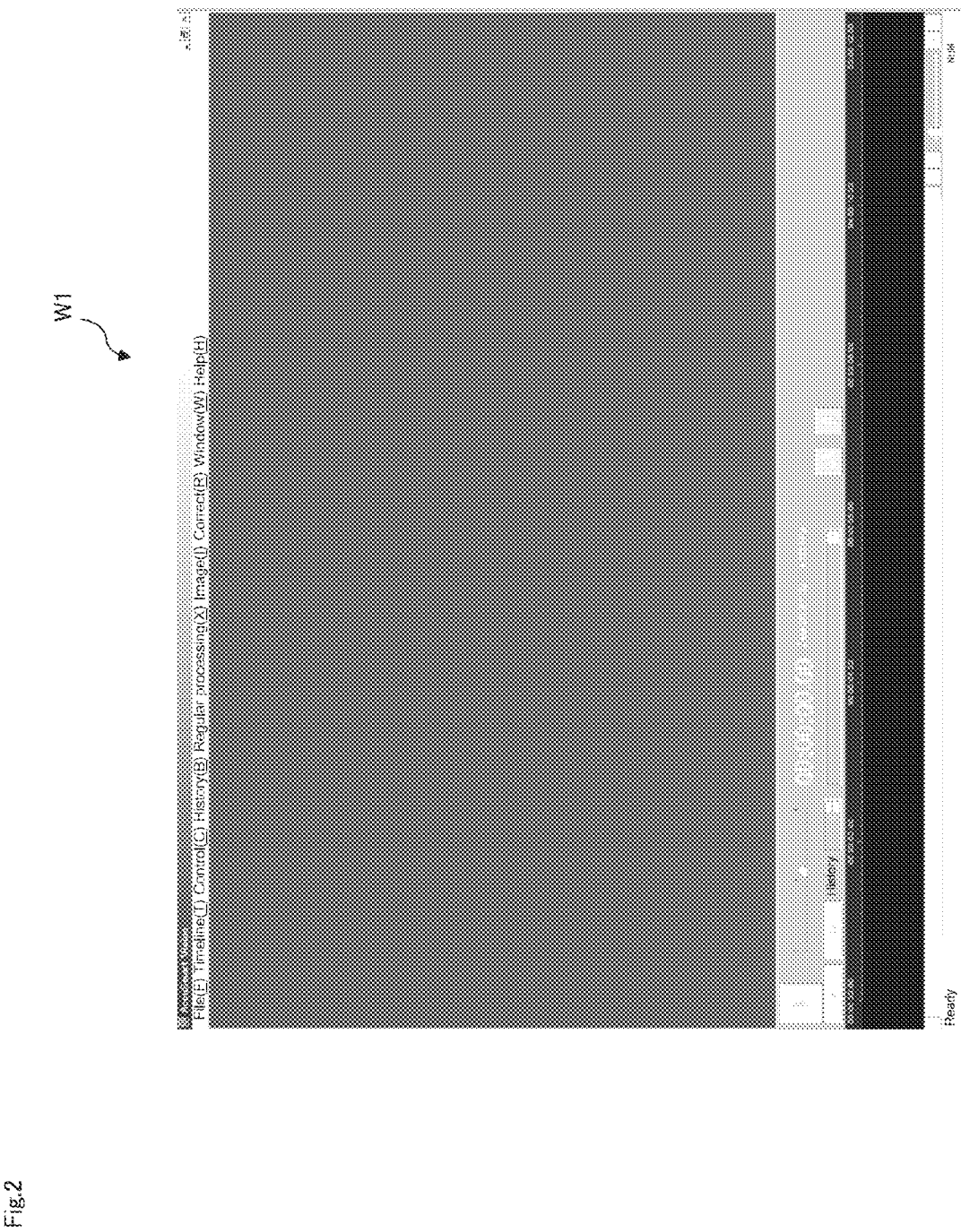
FIG. 2 is a diagram of a basic screen before image data is imported.

2. Detailed Description of Configuration and Operations of Image Processing Apparatus The control unit 40 starts the image processing program 2, on detecting that the user has performed a predetermined operation via the input unit 20. Once the image processing program 2 has been started, a basic screen W1 (FIG. 2) is displayed on the display 10. Note that the control unit 40 controls display of screens, windows, buttons and all other elements that are displayed on the display 10.

2-1. Import of Image Data

The basic screen W1 receives an instruction to import image data to the original image area 51 from the user. Image data imported to the original image area 51 is targeted for image processing which will be discussed later. The control unit 40 imports image data from a still image file or a moving image file to the original image area 51. Note that, in this specification, still image files are data files in a still image format, and moving image files are data files in a moving image format.

In the case of importing image data from a still image file, the user designates one still image file or one folder, by operating the input unit 20. In the case of the former, the control unit 40 prompts the user to input an address path and a filename of that still image file in the storage unit 30. In the case of the latter, the control unit 40 prompts the user to input an address path and a folder name of that folder in the storage unit 30. Thereafter, the control unit 40 saves the designated still image file or all the still image files in the designated folder as a still image file group in the original image area 51. Note that, the term "group" used in this specification is not limited to being made up of multiple elements, and may be made up of one element.

On the other hand, in the case of importing image data from a moving image file, the user inputs an address path and a filename of that one moving image file in the storage unit 30, by operating the input unit 20. The control unit 40, on detecting that the user has designated a moving image file, displays a moving image import window (not shown) on the basic screen W1 in a superimposed manner. The moving image import window receives selection of a timeline of arbitrary length by the user, from among the entire timeline of the designated moving image file. The control unit 40, on detecting that the user has selected a timeline of arbitrary length via the input unit 20, generates a still image file group corresponding to the selection. This still image file group corresponds one-to-one with the frame group included in the moving image of the timeline related to the user's selection. Thereafter, the control unit 40 saves this still image file group in the original image area 51.

Accordingly, in the present embodiment, a still image file rather than a moving image file is targeted for image processing discussed later. Still image files are imported to the original image area 51 in units of files or folder, or in full or partial units of the timeline of a moving image file.

2-2. Playback of Still Image File Group

When a still image file group has been imported to the original image area 51, the control unit 40 displays display windows W2 (FIG. 3) on the basic screen W1 in a superimposed manner. The same number of display windows W2 as the number of operations for importing still image file groups to the original image area 51 are displayed.

First, one still image file included in the still image file group imported to the original image area 51 (e.g., still image file corresponding to first frame on timeline) is displayed in the display window W2. Note that even when the still image file group originates from still image files rather than from moving image files, the control unit 40 recognizes the still image files included in the still image file group as being still image files that are arranged along a timeline. The arrangement is automatically judged from the attributes of the files (filename, created on date/time, updated on date/time, etc).

As will be discussed later, the frame displayed in the display window W2 changes in response to an operation by the user. The control unit 40 manages identification information of the frame currently displayed in the display window W2 in real time.

Figure 3:
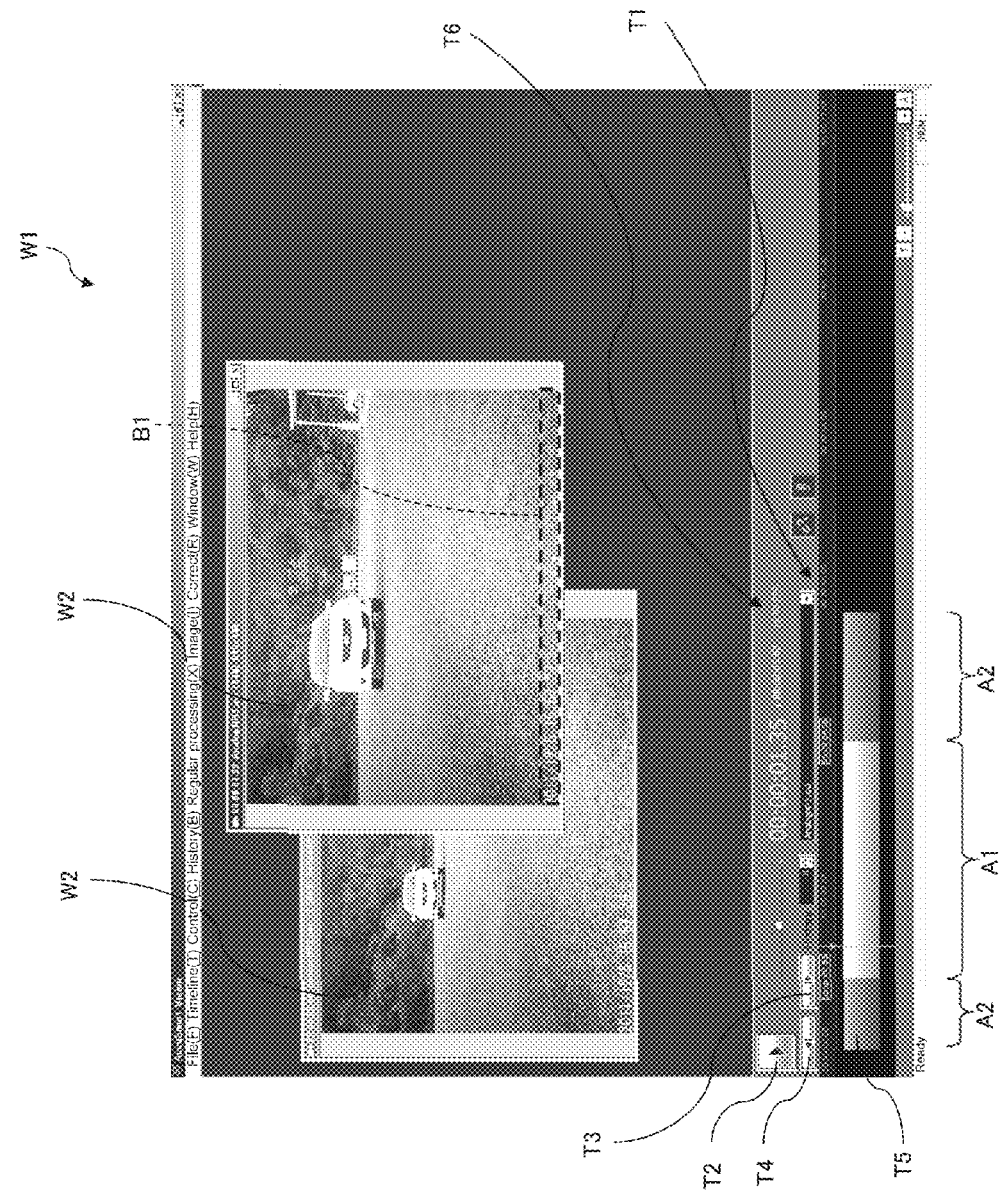
FIG. 3 is a diagram of the basic screen after image data has been imported.

The control unit 40 can playback the still image file group corresponding to the display window W2 as a moving image in the display window W2. As shown in FIG. 3, the control unit 40 displays a window selection pull-down menu T1, a play button T2, a frame advance button T3, a frame reverse button T4, a timeline bar T5 and an FPS setting area T6 on the basic screen W1.

Even if there are multiple display windows W2, there is only one active display window W2. The window selection pull-down menu T1 receives selection of which display window W2 to activate from the user. Hereinafter, the still image file group corresponding to the active display window W2 will be called the "active file group". Also, the frame currently displayed in the active display window W2 will be called the "active display frame".

The play button T2 receives an instruction to playback the active file group as a moving image from the user. The control unit 40, on detecting that the user has pressed the play button T2 via the input unit 20, displays frames of the active file group sequentially along the timeline in the active display window W2 in frame advance format. Note that playback starts from the active display frame at the point in time when the play button T2 is pressed. Also, the play button T2 receives an instruction to stop playback from the user. The control unit 40, on detecting that the user has pressed the play button T2 via the input unit 20 during playback, fixes the display in the active display window W2 to the active display frame at that point in time.

The frame advance button T3 and the frame reverse button T4 respectively receive instructions from the user to switch the active display frame to the next frame or the previous frame along the timeline of the active file group.

The timeline bar T5 diagrammatically represents the timeline of the active file group. The timeline bar T5 is equally divided, in the direction in which the bar extends, into the number of frames of the active file group. An nth divided area from the left on the timeline bar T5 corresponds to an nth frame on the timeline of the active file group (where n is a natural number).

As shown in FIG. 3, the timeline bar T5 displays a divided area A1 corresponding to a selected frame group in a different manner to a divided area A2 corresponding to a non-selected frame group. A selected frame group is a frame group corresponding to a segment that is currently selected on the timeline of the active file group. A non-selected frame group is a frame group corresponding to a segment that is currently not selected on the timeline of the active file group. In the present embodiment, the area A1 is displayed with a light color and the area A2 is displayed with a dark color.

The timeline bar T5 receives selection, from the user, of arbitrary segments on the timeline of the active file group. The selected segments may be continuous segments or may be discontinuous segments. In other words, the user is able to select an arbitrary number of arbitrary frames from among all the frames of the active file group, by operating the timeline bar T5 via the input unit 20. Specifically, the user selects a divided area corresponding to the frame that he or she wants to select on the timeline bar T5. It is possible to select a plurality of divided areas at the same time. The image processing unit 41 recognizes the selected frame group as a target for image processing discussed later. Note that the active display frame switches to a frame corresponding to the most recently selected divided area, whenever a divided area on the timeline bar T5 is selected by the user.

The FPS setting area T6 displays the frame rate at the time of playback of the active file group as a moving image, and receives changes thereto from a user.

2-3. Image Processing

Hereinafter, image processing (excluding analog noise removal processing discussed later) on a selected frame group will be described. The image processing unit 41 can execute a plurality of image processing modules for noise removal, sharpness, brightness, contrast/chroma adjustment, image resolution, rotation, image averaging, addition of characters/arrows/mosaic, and the like. The image processing modules are incorporated in the image processing program 2.

The user can select arbitrary modules from among the image processing modules in an arbitrary order an arbitrary number of times, by operating the basic screen W1 via the input unit 20. If necessary, the user, along with selecting an image processing module, inputs parameters that will be used at the time of executing the selected image processing module. Whenever it is detected that the user has selected one image processing module, the image processing unit 41 executes that image processing module on the selected frame group. Note that executing an image processing module on a selected frame group refers to executing the image processing module on each frame included in the selected frame group.

As the image processing module is executed sequentially on a frame once, twice, three times and so on, the frame is sequentially subject to first-order processing, second-order processing, third-order processing and so on. A 0th-order frame corresponds to a still image file saved in the original image area 51. An (m+1)th-order frame corresponds to a still image file obtained after an image processing module has been executed once on a still image file corresponding to an mth-order frame (where m is an integer greater than or equal to 0). The image processing unit 41 sequentially generates still image files corresponding to frames of the first-order onward, and saves each of these still image files separately in the processed file area 52.

Figure 4:
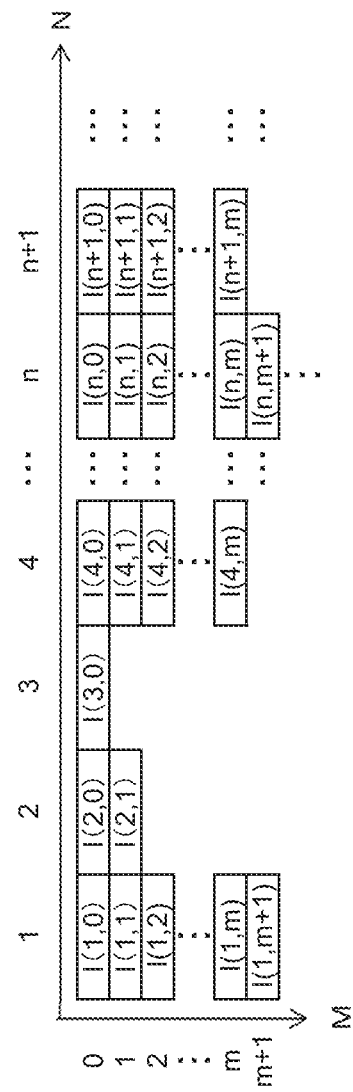
FIG. 4 is a diagram showing a still image group belonging to one timeline.

FIG. 4 is a conceptual diagram showing how a still image group belonging to one timeline is managed by the image processing program 2. In FIG. 4, an N axis which is the horizontal axis shows the order of frames on the timeline, and an M axis which is the vertical axis shows the order of processing. The rectangle corresponding to the coordinates (n, m) in the N–M space of FIG. 4 represents a still image I (n, m). The still image I (n, m) is the mth-order still image of the nth frame on the timeline (where n is a natural number, and m is an integer greater than or equal to 0).

The control unit 40 manages, for each frame, the value of the currently selected coordinate m in real time as a parameter $m_s$. Immediately after a still image file group has been imported to the original image area 51, the coordinate $m_s$ takes an initial value 0. Thereafter, every time the image processing module is executed, the coordinate $m_s$ of the frame is incremented by 1. Also, the user is able to freely change the coordinate $m_s$ of the selected frame group by performing a predetermined operation via the input unit 20. Note that executing an image processing module on a frame refers to executing the image processing module on an $m_s$-order still image of the frame. Accordingly, changing the coordinate $m_s$ effectively means changing the execution target of the image processing module.

Incidentally, displaying a frame refers to displaying a still image of the coordinate $m_s$ of the frame. Accordingly, changing the coordinate $m_s$ also effectively means changing the target to be displayed on the active display window W2.

2-4. Analog Noise Removal Processing

Next, analog noise removal processing will be described. The image processing unit 41 can execute an analog noise removal module. The analog noise removal module is incorporated in the image processing program 2. Hereinafter, an example of a frame group on which analog noise removal processing is effective (hereinafter, target frame group) will be described, after which the flow of analog noise removal processing on a target frame group will be described.

Figure 5:
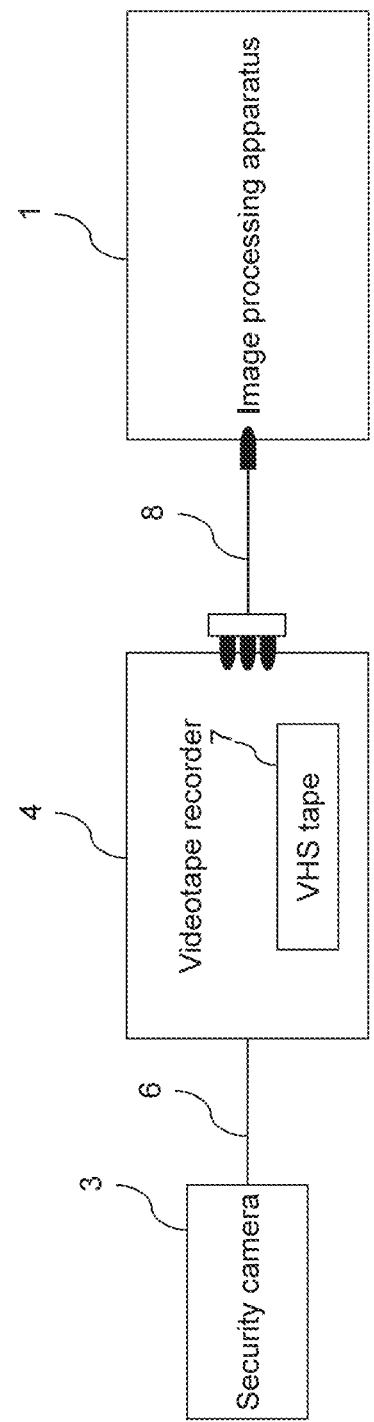
FIG. 5 is a diagram of a security camera, a videotape recorder, a video capture unit, and an image processing apparatus.

2-4-1. Example of Frame Group on which Analog Noise Removal Processing is Effective A target frame group is a frame group included in a moving image that was captured by the security camera 3 and recorded by the videotape recorder 4. As shown in FIG. 5, the security camera 3 is connected to the videotape recorder 4 via a coaxial cable 6, and outputs an analog video signal to the videotape recorder 4. The videotape recorder 4 records an analog video signal from the security camera 3 to a VHS tape 7 which is an analog recording medium.

The user connects the videotape recorder 4 to the image processing apparatus 1 via the video capture unit 8, when he or she desires image processing of video recorded on the VHS tape 7. The video capture unit 8 converts the analog video signal transmitted from the videotape recorder 4 into a digital video signal, and outputs the digital video signal to the image processing apparatus 1. An encoder program (not shown) is installed in the image processing apparatus 1. The encoder program is a program that encodes the digital video signal from the video capture unit 8 and generates a moving image file or a still image file group that can be imported by the image processing program 2. The user starts the encoder program and generates a moving image file or a still image file group including the video recorded on the VHS tape 7. Next, the user imports image data from the moving image file or the still image file group to the original image area 51 in the manner described above. At this time, the frame group corresponding to the still image file group saved in the original image area 51 is the target frame group.

In the present embodiment, the frame rate of the security camera 3 differs from the frame rate of the videotape recorder 4. Specifically, the frame rate of the security camera 3 is 1 FPS (Frames Per Second), and the frame rate of the videotape recorder 4 is 29.97 FPS. Accordingly, in the present embodiment, the frame rate of the security camera 3 is lower than the frame rate of the videotape recorder 4, and, furthermore, neither frame rate is an integer multiple of the other.

Figure 6:
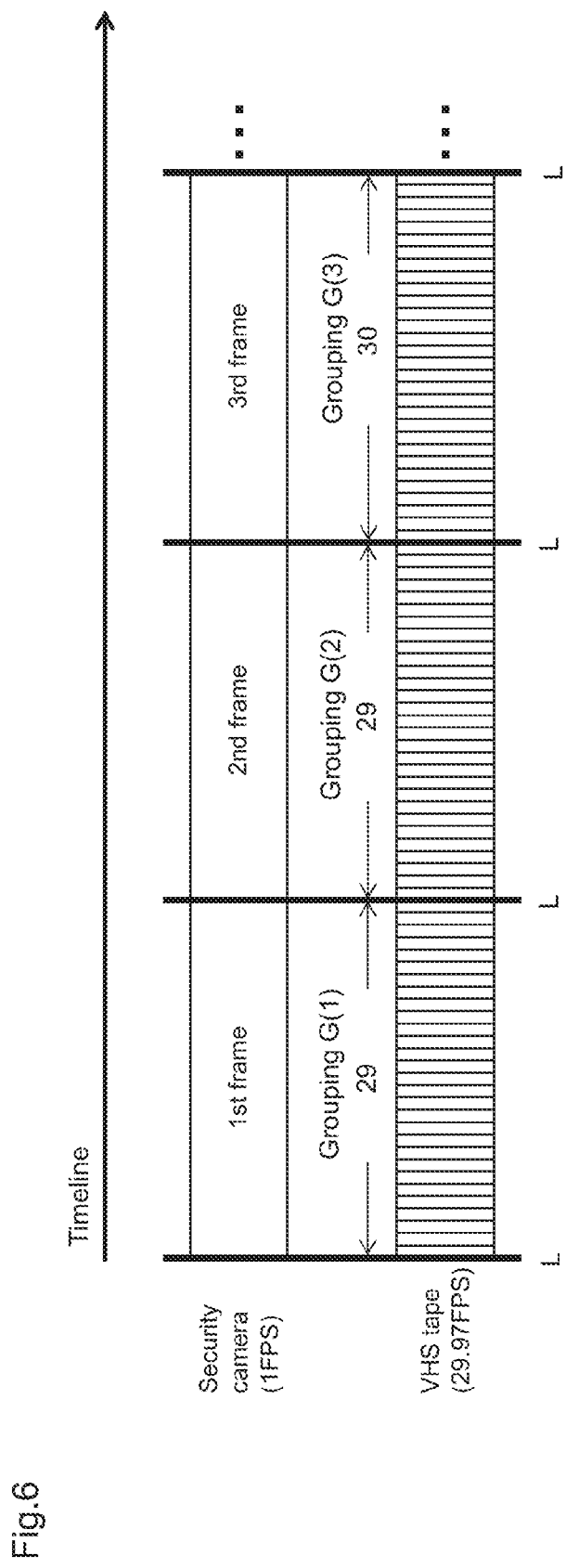
FIG. 6 is a diagram in which frames captured by a security camera and frames recorded on a VHS tape are arranged in on the same time scale.

As a result, as shown in FIG. 6, one frame captured with the security camera 3 could be recorded on the VHS tape 7 as 29 or 30 frames. More precisely, the first, second and third frames along the timeline of the security camera 3 could be sequentially recorded to the VHS tape 7 as 29 frames, 29 frames and 30 frames, and subsequent frames can be recorded in the same manner.

Accordingly, frames are recorded to the VHS tape 7 in a manner such that each frame captured with the security camera 3 appears successively a plurality of times along the timeline. A plurality of frames recorded to the VHS tape 7 that originate from the same one frame of the security camera 3 differ, however, mainly due only to the random noise component. In other words, a frame group in which similar frames that mainly only differ due to the random noise component appear successively a plurality of times along the timeline is recorded to the VHS tape 7.

Also, although the number of frames recorded to the VHS tape 7 that originate from one frame of the security camera 3 is roughly the same irrespective of the frames of the security camera 3, the number of frames does differ by several frames depending on the frames of the security camera 3. Accordingly, frames are recorded to the VHS tape 7 in a manner such that for each frame captured with the security camera 3, roughly the same numbers (approx. 30 frames) of frames appear successively along the timeline. Hereinafter, the frames corresponding to an nth frame along the timeline of the security camera 3, among the frames recorded on the VHS tape 7, are taken as frames belonging to a grouping G(n) (where n is a natural number).

In the present embodiment, the security camera 3 and the videotape recorder 4 use interlacing. Accordingly, one frame captured with the security camera 3 consists of the one odd numbered field and the one even numbered field. Similarly, one frame recorded to the VHS tape 7 also consists of the one odd numbered field and the one even numbered field. Accordingly, there is a relatively high possibility that a frame near a boundary L will be an image combining two fields that originate from different frames of the security camera 3, in the arrangement of the frames sequentially recorded along the timeline on the VHS tape 7. As shown in FIG. 6, the boundary L is the boundary between frames belonging to a grouping G(n) and frames belonging to a grouping G(n+1), in the arrangement of frames sequentially recorded along the timeline in the VHS tape 7 (where n is a natural number). Accordingly, there is a relatively high possibility that the first and last frames along the timeline in the grouping G(n) are not similar to the other frames in the same grouping G(n).

2-4-2. Flow of Analog Noise Removal Processing

Figure 7:
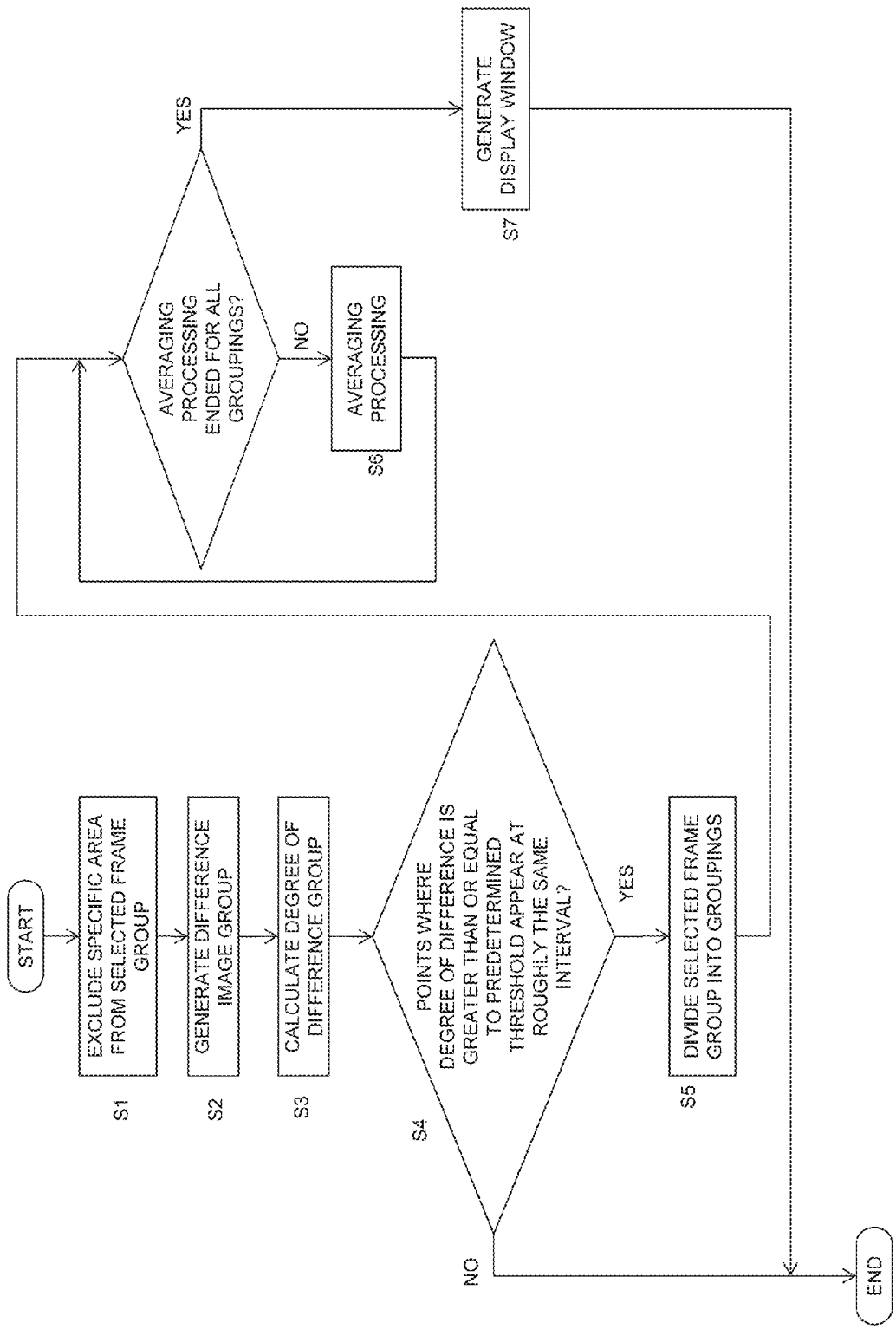
FIG. 7 is a flowchart showing the flow of analog noise removal processing.

Hereinafter, the flow of analog noise removal processing on a target frame group will be described, with reference to FIG. 7. As described above, in the present embodiment, a target frame group is a frame group recorded by the analog security camera 3 and the analog videotape recorder 4. Accordingly, although each frame included in a target frame group contains random noise, the random noise can be removed by executing analog noise removal processing on the target frame group.

The image processing unit 41 sets a selected frame group as the target for execution of analog noise removal processing. Accordingly, the user selects a target frame group that he or she wants to undergo analog noise removal processing as the selected frame group by operating the input unit 20. In the case where, however, only one frame is included in the selected frame group, analog noise removal processing cannot be performed. The image processing unit 41, on detecting that the user has performed a predetermined operation on the basic screen W1 in a state where a selected frame group including a plurality of frames is appropriately designated, starts the analog noise removal processing shown in FIG. 7.

First, at step S1, the area setting unit 41a excludes a specific area B1 (see FIG. 3) from each frame included in the selected frame group, in accordance with a predetermined rule. In the present embodiment, the excluded specific area B1 is a horizontally elongated area in a lower portion of the frame. Also, in the present embodiment, as the predetermined rule for specifying the position of the specific area B1, information indicating to exclude X % of a lower portion of a frame (or to leave X % of an upper portion of a frame), for example, is defined in advance. Note that the specific area B1 is excluded in step S1 because subtitle information such as time and the like is often displayed in an area such as B1. In other words, it may not be possible to correctly judge the grouping G(n) in the following steps S2 to S5 in a state where the specific area B1 is left in the selected frame group. Accordingly, from this perspective, a configuration can also be adopted in which, for example, an upper X % of a frame is excluded as the specific area B1, instead of or in addition to a lower area of the frame. Hereinafter, for ease of description, the selected frame group from which the specific area B1 has been excluded will also be referred to simply as the "selected frame group".

At the following steps S2 to S4, the pattern detection unit 41b then judges whether changing points where there is a large change between adjacent frames included in the selected frame group appear at roughly the same interval along the timeline.

Figure 8:
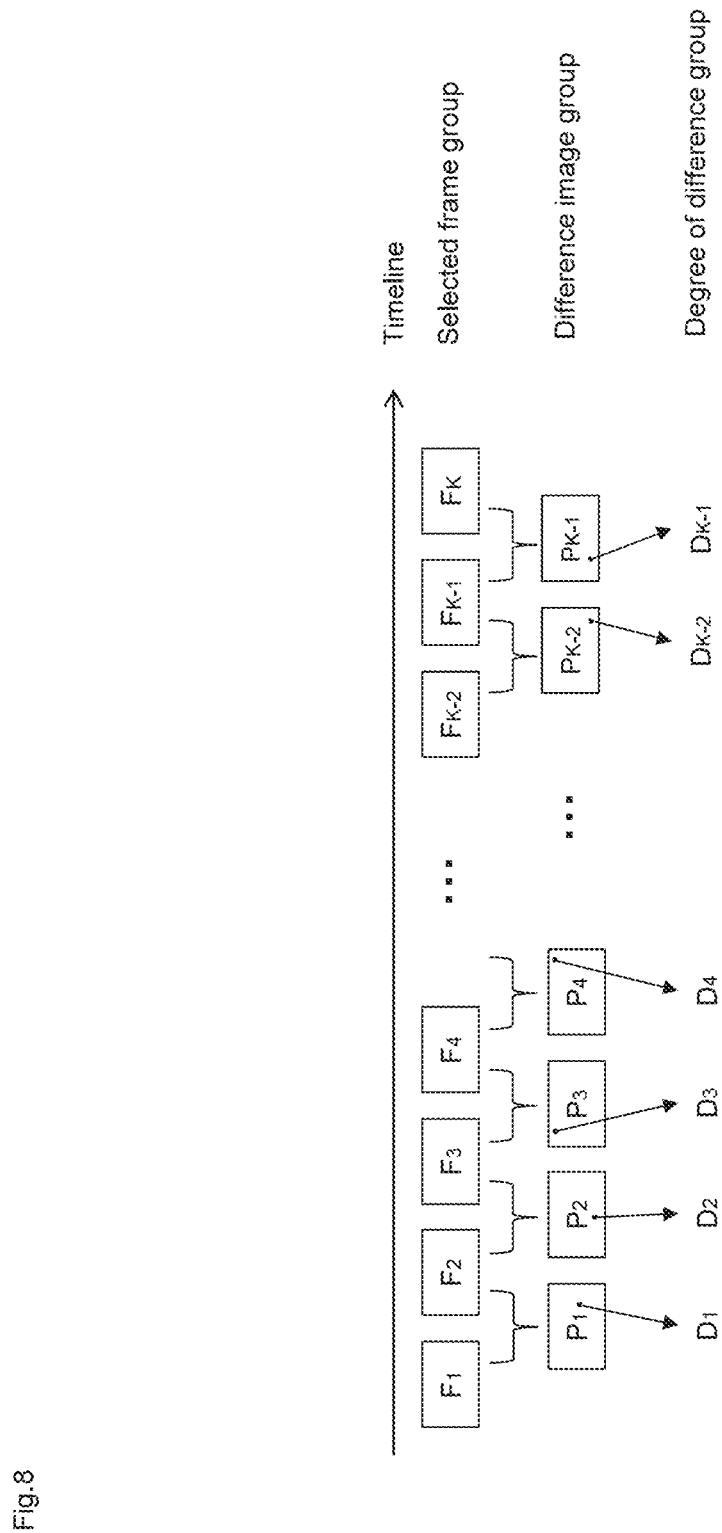
FIG. 8 is a diagram showing the relationship between a selected frame group, a difference image group and a degree of difference group on a timeline.

Here, it is assumed that K number of frames $F_1, \ldots, F_K$ (where K is an integer greater than or equal to 2) are included in the selected frame group. In this case, at step S2, the pattern detection unit 41b generates (K−1) number of difference images $P_1, \ldots, P_{K-1}$ from the K frames $F_1, \ldots, F_K$ (see FIG. 8). Here, the difference image $P_i$ is the difference image between the frame $F_i$ and the frame $F_{i+1}$ (where i=1, 2, . . . , K−1), and is generated, for each pixel, by subtracting the pixel value of that pixel in the frame $F_{i+1}$ from the pixel value of that pixel in the frame $F_i$.

At the following step S3, the pattern detection unit. 41b calculates a degree of difference $D_i$ for each difference image $P_i$ included in the difference images $P_i, \ldots, P_{K-1}$. The degree of difference $D_i$ is an index representing the extent of the change between adjacent frames $F_i$ and $F_{i+1}$, and in the present embodiment is the maximum of the absolute values of pixel values included in the difference image $P_i$.

At the following step S4, the pattern detection unit 41b judges whether points (changing points) at which the degrees of difference $D_1, \ldots, D_{K-1}$ are greater than or equal to a predetermined threshold appear at roughly the same interval along the timeline. Note that, in the present embodiment, the pattern detection unit 41b calculates, as the value of the threshold that is compared with degrees of difference $D_1, \ldots, D_{K-1}$, an average value of degrees of difference that are greater than or equal to an average value of the degrees of difference $D_1, \ldots, D_{K-1}$, from among the degrees of difference $D_1, \ldots, D_{K-1}$.

Figure 9:
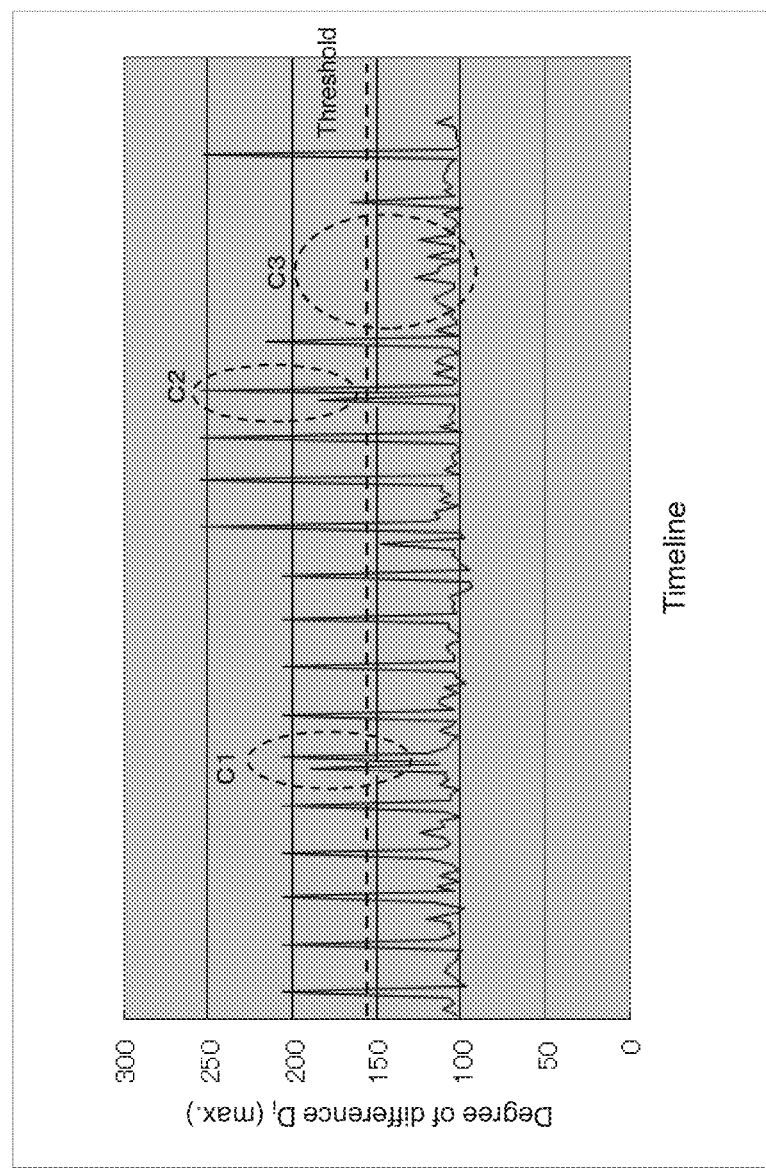
FIG. 9 is a graph of the degree of difference (maximum) on a timeline.

FIG. 9 is a timeline (horizontal axis)—degree of difference $D_i$ (vertical axis) graph in the case where analog noise removal processing has been executed on a target frame group. In the case where analog noise removal processing is executed on a target frame group, changing points thus appear at roughly the same interval along the timeline. More specifically, the changing points generally appear at time intervals that are equivalent to 29 frames, 29 frames, 30 frames and so on along the timeline. Note that, in FIG. 9, the degree of difference $D_i$ is constantly about 100 or greater for the entire segment of the timeline, with this value of 100 being caused by random noise.

To give a more detailed description of step S4, first the pattern detection unit 41b specifies the array of the numbers of frames between changing points on the timeline, such as 29, 29, 30 and so on. The pattern detection unit 41b then judges that the changing points appear at roughly the same interval along the timeline, in the case where the percentage of elements contained within a predetermined range (e.g., 4) relative to all the elements (29, 29, 30, etc.) included in the array is greater than or equal to a predetermined percentage (e.g., 90%). In this case, the processing advances to step S5. On the other hand, if this is not the case, it is judged that the changing points do not appear at roughly the same interval along the timeline, and the processing ends.

Next, at step S5, the grouping division unit 41c divides the selected frame group into groupings Gc(1), Gc(2) and so on along the timeline, in accordance with the array of the numbers of frames between the changing points specified at step S4, that is, the interval at which the changing points appear along the timeline. Although these groupings Gc(1), Gc(2) and so on would originally be expected to coincide with the groupings G(1), G(2) and so on, exceptions such as C1 to C3 in FIG. 9 can exist in the pattern in which the changing points actually appear on the timeline. In view of this, the following processing is performed in order to eliminate this error.

That is, the grouping division unit 41c, in order to respond to the case where changing points do not exist where they would originally be expected, such as with C3 in FIG. 9, estimates the positions of the changing points that would originally be expected to exist, in accordance with the array of the numbers of frames between the changing points specified at step S4, and corrects the groupings Gc(1), Gc(2) and so on. Specifically, in the present embodiment, in the case where there is the element, that is roughly N times the other elements (where N is an integer), in the array (29, 29, 30, . . . ) of the numbers of frames between the changing points specified at step S4, the groupings Gc(1), Gc(2) and so on are corrected, by dividing the frame group corresponding to that element into N groupings along the timeline. Also, in the case where a plurality of changing points appear successively on the timeline, such as with C1 and C2 in FIG. 9, the grouping division unit 41c corrects the groupings Gc(1), Gc(2) and so on, by disregarding a changing point that is judged to be less appropriate, in accordance with the array of the numbers of frames between the changing points specified at step S4. Specifically, in the present embodiment, in the case where an element having a value "1" is included in the array (29, 29, 30, . . . ) of the numbers of frames between the changing points specified at step S4, the groupings Gc(1), Gc(2) and so on are corrected, by reclassify the frame corresponding to that element into a group corresponding to the smaller of the element immediately before and the element immediately after that element. As a result, the correct groupings G(1), G(2) and so on will be defined. Thereafter, the grouping division unit 41c re-divides the selected frame group into groupings G(1), G(2) and so on along the timeline.

Next, at step S6, the noise removal unit 41d removes random noise from the selected frame group, in units of the groupings G(n) divided by the grouping division unit 41c at step S5. Specifically, the noise removal unit 41d executes the following averaging processing for each of the groupings G(1), G(2) and so on. The averaging processing for the grouping G(1) is as follows.

First, the noise removal unit 41d defines a grouping Ge(1). The grouping Ge(1) is a grouping from which exclusion frames have been excluded from all the frames belonging to the grouping G(1). An exclusion frame is a frame that commonly corresponds to a plurality of changing points that appear successively along the timeline.

Here, there is a relatively high possibility that frames near the boundary L between adjacent groupings G(n), that is, the first and last frames in the groupings G(n), will not be similar to the other frames in the same groupings G(n). As described above, this is because there is a relatively high possibility that such frames are images combining two fields that originate from different frames of the security camera 3. Since frames that commonly corresponding to a plurality of changing points that appear successively along the timeline are conceivably such first or last frames, in step S6, these frames are excluded from the grouping G(n) in order to exclude these frames from the averaging processing.

Next, the noise removal unit 41d averages all the frames included in the grouping Ge(1), and generates one representative frame representing the grouping G(1). Specifically, the noise removal unit 41d calculates, for each pixel, the average value of the pixel values of all the frames included in the grouping Ge(1), and generates one new representative frame that takes the calculated average values as the pixel values of the corresponding pixels. The still image file of the representative frame is saved to the processed file area 52 as a separate file from the still image files of all the frames included in grouping Ge(1).

Subsequently, similar averaging processing is also performed for the groupings G(2) and so on. When the averaging processing for all of the groupings G(1), G(2) and so on had ended, a group of the representative frames equal in number to the number of groupings G(1), G(2) and so on will have been generated. Subsequently, the control unit 40 manages this representative frame group as a moving image on a new timeline.

Figure 10:
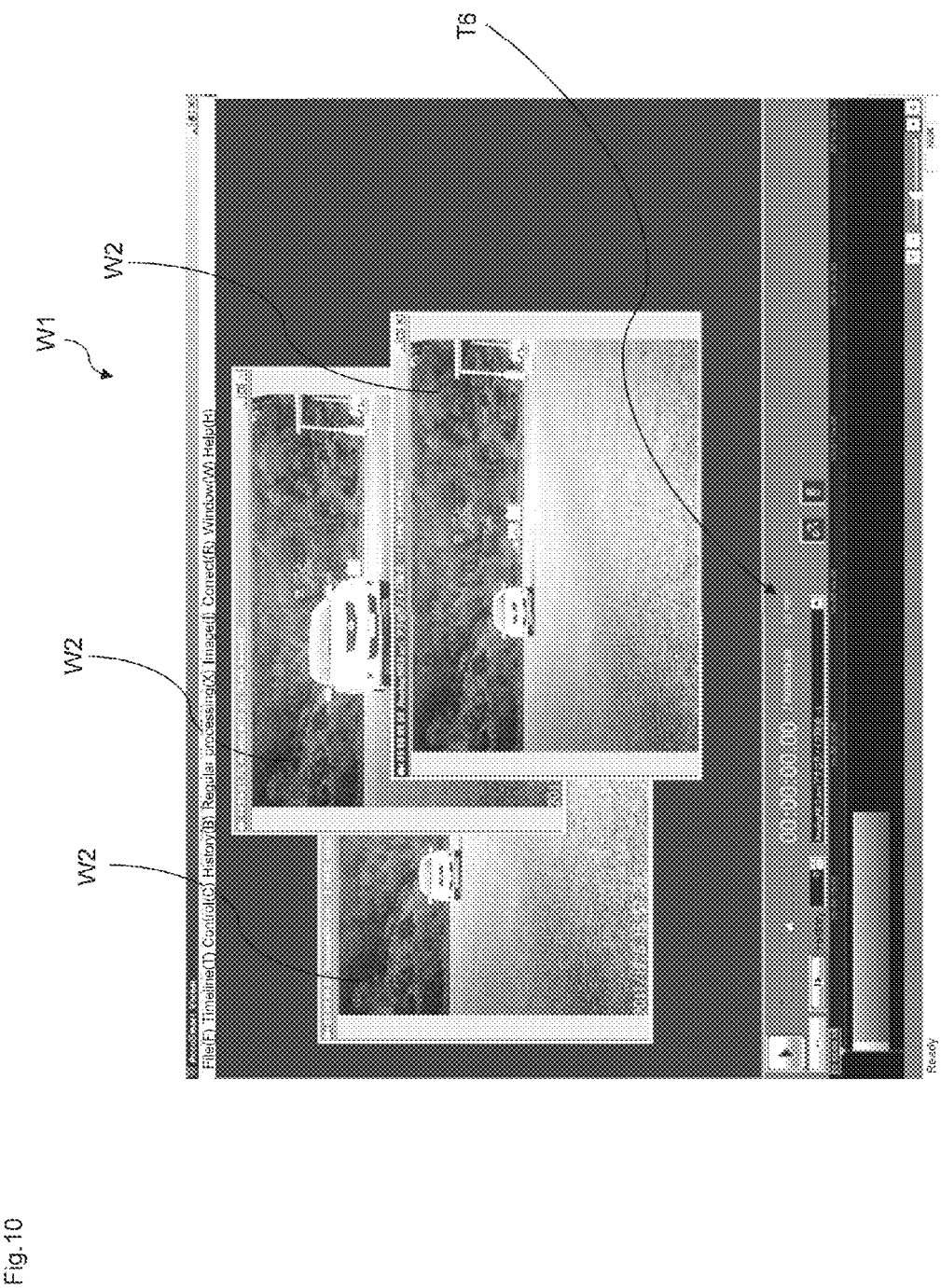
FIG. 10 is a diagram of a basic screen after analog noise removal processing has been executed from the state of FIG. 3.

At the following step S7, the control unit 40 newly creates a display window W2 corresponding to this new timeline, and displays the newly created display window W2 on the basic screen W1. FIG. 10 is a diagram of the basic screen W1 after analog noise removal processing has been executed from the state in FIG. 3. As is evident from a comparison of the FPS setting areas T6 in FIGS. 3 and 10, the control unit 40 calculates the frame rate of this new timeline. Specifically, this new frame rate is calculated by multiplying the frame rate of the original selected frame group by the percentage of frames omitted at step S6 (number of frames included in the representative frame group out of the number of frames included in the original selected frame group). Thereafter, analog noise removal processing then ends.

3. Applications

The image processing program 2, while being able to handle image processing on a wide variety of moving images, can also be utilized in the analysis of surveillance video captured by a security camera for the investigation of an incident by an organization such as the police, for example. The analog noise removal processing according to the present embodiment is useful in removing various types of noise such as random noise from surveillance video captured by a security camera and recorded by a videotape recorder, for example.

4. Features 4-1

In the above embodiment, in steps S2 to S4, it is judged whether changing points where there is a large change between adjacent frames included in the selected frame group appears at roughly the same interval along a timeline. In other words, it is judged whether the frames are arranged in a manner such that similar frames appear successively in roughly the same numbers on the timeline. If it is judged that the selected frame group on the timeline is arranged in such a manner, the groupings G(1), G(2) and so on which serve as units for removing random noise are then decided, in accordance with the interval at which the changing points appear, that is, the interval for which similar frames successively appear. That is, the groupings G(1), G(2) and so on which serve as units for removing random noise are groupings of similar frames. Accordingly, in the case where the selected frame group is a frame group in which similar frames appear successively in roughly the same numbers along the timeline, random noise can be removed with high accuracy.

4-2

In the above embodiment, in step S6, for each grouping Ge(n) consisting of a plurality of similar frames, one representative frame from which random noise has been removed is generated from those similar frames. Accordingly, redundancy due to similar frames appearing a plurality of times is eliminated on the new timeline.

5. Variations

Although an embodiment of the present invention has been described above, the present invention is not limited to the above embodiment, and various modifications are possible within a scope that does not deviate from the gist of the invention. For example, the following modifications are possible.

5-1

The timing at which the analog noise removal processing is executed is not limited to that described above. For example, a configuration may be adopted in which the analog noise removal processing is automatically executed, at the time that image data is imported to the original image area 51, on the frame group included in the still image file or moving image file from which the image data was imported. Furthermore, in this case, it is desirable that the user be able to preset, with environmental settings or the like, whether or not the analog noise removal processing is automatically executed at the time that image data is imported to the original image area 51.

5-2

In the above embodiment, the position of the specific area B1 that is excluded at step S1 is determined in advance, but a configuration may be adopted in which it is automatically judged whether there is an area displaying information that should be excluded such as subtitles, by performing image processing on the selected frame group, and only if it is judged that such an area exists is such an area excluded as the specific area B1. Alternatively, a configuration may be adopted in which, before starting the analog noise removal processing, the user is allowed to manually select the specific area B1 (or an area to be left other than specific area B1).

5-3

In step S4, the predetermined threshold that is compared with degrees of difference $D_1, \ldots, D_{K-1}$ is not limited to that described above, and any arbitrary value can be employed that enables changing points corresponding to the boundary L between the groupings G(n) to be detected. For example, the average value of the degrees of difference $D_1, \ldots, D_{K-1}$ may be employed.

5-4

In the above embodiment, in step S3, the maximum of the absolute values of the pixel values included in the difference image $P_i$ is calculated as the degree of difference $D_i$, but the present invention is not limited thereto, and, for example, the average of the absolute values of the pixel values included in the difference image $P_i$ may be calculated, or the average of the absolute values of the pixel values of the upper L pixel values may be calculated (where L≥2). Here, FIG. 11 is a timeline (horizontal axis)—degree of difference $D_i$ (vertical axis) graph in the case where the analog noise removal processing has been executed on a target frame group, the degree of difference $D_i$ (vertical axis) being the average of the absolute values of the pixel values included in the difference image $P_i$. Note that in the case where the maximum of the absolute values of the pixel values of the difference image $P_i$ is used as the degree of difference $D_i$, as in the above embodiment, there is an advantage in that small changes are easier to find than in the case where the average shown in FIG. 11 is used as the degree of difference $D_i$.

5-5

In the above embodiment, the number Y of representative frames generated for each grouping G(n) in step S6 was one, but the present invention is not limited thereto, and the number Y can be an arbitrary number. When the number of frames belonging to the grouping G(n) is given as X, Y may be equal to X, Y may be greater than X, or Y may be less than X. From the perspective of reducing the redundancy of similar frames, however, it is desirable that Y is less than X.

5-6

Analog noise removal processing is not only applicable to a target frame group as illustrated in the above embodiment but is also applicable to all frame groups in which similar frames appear successively in roughly the same numbers along a timeline. For example, in the case where the frame rate of the recording apparatus is an integer multiple of the frame rate of the image capture apparatus, there is a high possibility that similar frames will appear successively in the same numbers (plurality of frames) along the timeline, with analog noise removal processing naturally also being applicable in such a case.

5-7

In the above embodiment, frame groups included in video recorded by an analog recording apparatus (videotape recorder 4) was illustrated as frame groups on which analog noise removal processing is effective, but analog noise removal processing may also be applied to frame groups that are generated from digitally compressed image data recorded by a digital recording apparatus. This is because frame groups that are included in digitally compressed image data also contain various types of noise. In particular, in the case of a moving image file on which inter-frame compression is executed, the data of complete frames may only be included at a rate of one frame every plurality of frames. In this case, it is often only the difference data from complete frames that is recorded as the data of other frames, resulting in a tendency for noise to increase. Accordingly, frame groups generated from such digitally compressed image data are suitable for executing the abovementioned analog noise removal processing.

5-8

In step S6, the method of removing noise from a frame group is not limited to the abovementioned method of calculating an average value. For example, for each pixel, a histogram of the pixel values of the frame group may be created every predetermined increment, and the pixel value of the increment having the highest distribution may be taken as the pixel value of the pixel after the noise removal. Note that various methods of averaging out a plurality of pixel values can be appropriately selected as the method of calculating an average value, such as calculating the arithmetic mean or the geometric mean.

5-9

In the above embodiment, both the security camera 3 and the videotape recorder 4 use interlacing, but the analog noise removal processing is also applicable to a frame group captured and recorded by devices that do not use interlacing. However, since the abovementioned analog noise removal processing has the function of excluding at least one of the first frame and the last frame of the grouping G(n) from the averaging processing of step S6, the analog noise removal processing is particularly useful in the case where at least one of the image capture apparatus and the recording apparatus uses interlacing.

5-10

In the above embodiment, the representative frame group generated at step S7 is managed on a new timeline but may be managed on the original timeline. When the selected frame group is given as a frame group corresponding to a still image having a coordinate m=j (where j is an integer greater than or equal to 0), the representative frame group is given as a frame group corresponding to a still image having a coordinate m=(j+1). As a result, the user can check on the active display window W2 while instantaneously switching between the still image before and after execution of the analog noise removal processing, by manipulating the coordinate $m_s$ of the frame.

5-11

In the above embodiment, all image data imported to the original image area 51 is saved as a still image file. However, image data imported to the original image area 51 may be saved as a moving image file. Furthermore, in the case where image processing is subsequently performed on a moving image file, the image data after image processing may also be saved in the form of a moving image file.

The invention claimed is:

1. An image processing apparatus configured to remove noise from a frame group on a timeline, comprising:
   a judgment unit configured to identify changing points along the timeline, each of the changing points being a point where there is a large change between adjacent frames included in the frame group, and judge whether a pattern exists whereby the changing points appear at roughly a same interval along the timeline;
   a division unit configured to, in a case where it is judged that there is a pattern whereby the changing points appear at roughly the same interval, divide the frame group into a plurality of groupings along the timeline in accordance with the interval determined by said judgment unit; and
   a removal unit configured to remove noise from the frame group in units of the groupings, wherein the removal unit is configured to perform the noise removal for each grouping, using frames belonging to the grouping other than an exclusion frame, the exclusion frame being a frame commonly corresponding to a plurality of changing points that appear successively along the timeline,
   wherein the removal unit is configured to generate, for each grouping, Y number of representative frames representing X number of frames belonging to the grouping, where X≥2 and Y<X.

2. The image processing apparatus according to claim 1, wherein Y=1.

3. The image processing apparatus according to claim 2, wherein the removal unit is configured to perform the noise removal for each grouping, by averaging two or more frames belonging to the grouping.

4. The image processing apparatus according to claim 2, wherein the frame group is a frame group that is captured by an image capture apparatus and recorded by a recording apparatus having a higher frame rate than the image capture apparatus.

5. The image processing apparatus according to claim 1, wherein the removal unit is configured to perform the noise removal for each grouping, by averaging two or more frames belonging to the grouping.

6. The image processing apparatus according to claim 1, wherein the frame group is a frame group that is captured by an image capture apparatus and recorded by a recording apparatus having a higher frame rate than the image capture apparatus.

7. An image processing apparatus configured to remove noise from a frame group on a timeline, comprising:
   a judgment unit configured to identify changing points along the timeline, each of the changing points being a point where there is a large change between adjacent frames included in the frame group, and judge whether a pattern exists whereby the changing points appear at roughly a same interval along the timeline;
   a division unit configured to, in a case where it is judged that there is a pattern whereby the changing points appear at roughly the same interval, divide the frame group into a plurality of groupings along the timeline in accordance with the interval determined by said judgment unit; and
   a removal unit configured to remove noise from the frame group in units of the groupings, wherein the removal unit is configured to perform the noise removal for each grouping, using frames belonging to the grouping other than an exclusion frame, the exclusion frame being a frame commonly corresponding to a plurality of changing points that appear successively along the timeline,
   wherein the removal unit is configured to perform the noise removal for each grouping, by averaging two or more frames belonging to the grouping.

8. The image processing apparatus according to claim 7, wherein the frame group is a frame group that is captured by an image capture apparatus and recorded by a recording apparatus having a higher frame rate than the image capture apparatus.

9. An image processing apparatus configured to remove noise from a frame group on a timeline, comprising:
   a judgment unit configured to identify changing points along the timeline, each of the changing points being a point where there is a large change between adjacent frames included in the frame group, and judge whether a pattern exists whereby the changing points appear at roughly a same interval along the timeline;
   a division unit configured to, in a case where it is judged that there is a pattern whereby the changing points appear at roughly the same interval, divide the frame group into a plurality of groupings along the timeline in accordance with the interval determined by said judgment unit; and
   a removal unit configured to remove noise from the frame group in units of the groupings, wherein the removal unit is configured to perform the noise removal for each grouping, using frames belonging to the grouping other than an exclusion frame, the exclusion frame being a frame commonly corresponding to a plurality of changing points that appear successively along the timeline,
   wherein the frame group is a frame group that is captured by an image capture apparatus and recorded by a recording apparatus having a higher frame rate than the image capture apparatus.

10. An image processing apparatus configured to remove noise from a frame group on a timeline, comprising:
    a judgment unit configured to judge whether changing points where there is a large change between adjacent frames included in the frame group appear at roughly the same interval along the timeline;
    a division unit configured to, in a case where it is judged that the changing points appear at roughly the same interval, divide the frame group into a plurality of groupings along the timeline in accordance with the interval; and
    a removal unit configured to remove noise from the frame group in units of the groupings, wherein the removal unit is configured to perform the noise removal for each grouping, using frames belonging to the grouping other than an exclusion frame, the exclusion frame being a frame commonly corresponding to a plurality of changing points that appear successively along the timeline.

11. The image processing apparatus according to claim 10, wherein the removal unit is configured to generate, for each grouping, Y number of representative frames representing X number of frames belonging to the grouping, where $X \geq 2$ and $Y < X$.

12. The image processing apparatus according to claim 11, wherein $Y = 1$.

* * * * *